United States Patent [19]
Hicks

[11] Patent Number: 5,103,497
[45] Date of Patent: Apr. 7, 1992

[54] FLYING SPOT ENDOSCOPE

[76] Inventor: John W. Hicks, 312 Howard St., Northboro, Mass. 01532

[21] Appl. No.: 637,157

[22] Filed: Jan. 3, 1991

Related U.S. Application Data

[62] Division of Ser. No. 436,446, Nov. 14, 1989.

[51] Int. Cl.$^5$ .............................. G02B 23/26
[52] U.S. Cl. ................... 385/117; 385/126; 385/116
[58] Field of Search .............. 350/96.24–96.27, 350/96.33; 355/1

[56] References Cited

U.S. PATENT DOCUMENTS 3,389,950  6/1968  Harper .................... 358/96.25

FOREIGN PATENT DOCUMENTS

| | | | |
|---|---|---|---|
| 0257798 | 3/1988 | European Pat. Off. | 350/96.25 |
| 2569278 | 2/1986 | France | 350/96.25 |
| 56-158305 | 12/1981 | Japan | 350/96.25 |
| 58-168013 | 10/1983 | Japan | 350/96.25 |
| 61-90125 | 5/1986 | Japan | 350/96.25 |
| 1171552 | 11/1969 | United Kingdom | 350/96.25 |

*Primary Examiner*—John D. Lee
*Assistant Examiner*—John Ngo
*Attorney, Agent, or Firm*—Samuels, Gauthier & Stevens

[57] ABSTRACT

A fiber optic scanning system having a multifiber. The multifiber having a first group of cores having an index of refraction N1 and a second group of cores having an index of refraction N2. The cores being positioned in a matrix. The cores of the groups being arrayed so that the adjacent cores of any core are members of the other group. The index difference between N1 and N2 being great enough to produce substantial mismatch in the cores and to substantially reduce cross talk between any core of one group and any core of the other group.

61 Claims, 5 Drawing Sheets

FIG. 1
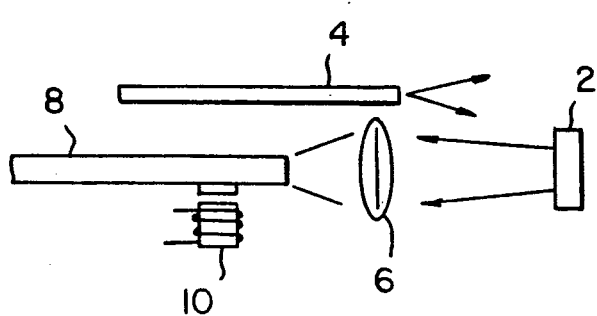
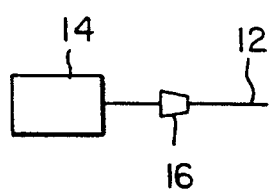
FIG. 2a
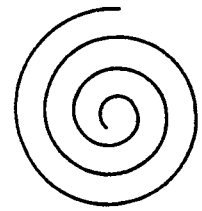
FIG. 2b
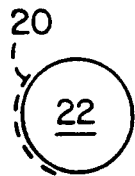
FIG. 3
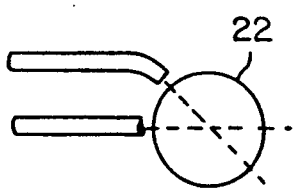
FIG. 4
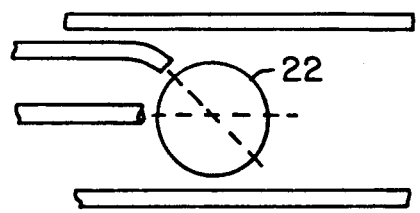
FIG. 5

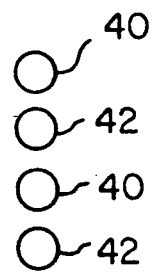
FIG. 15
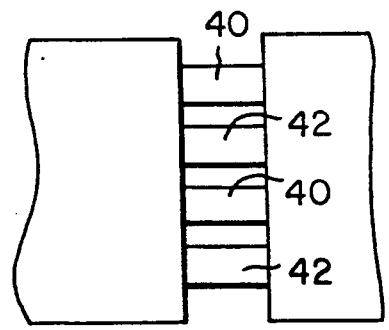
FIG. 16
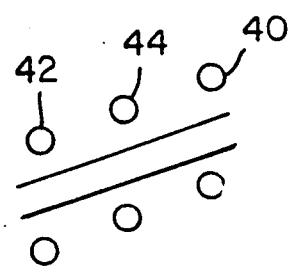
FIG. 17
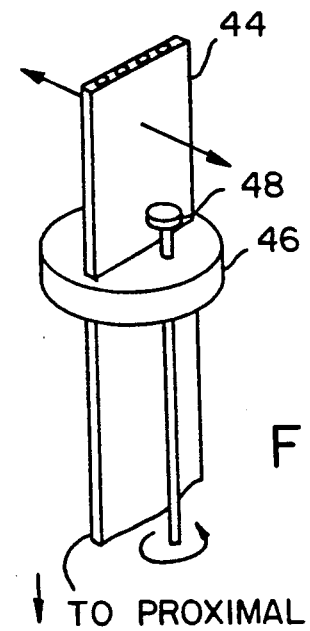
FIG. 18
FIG. 19
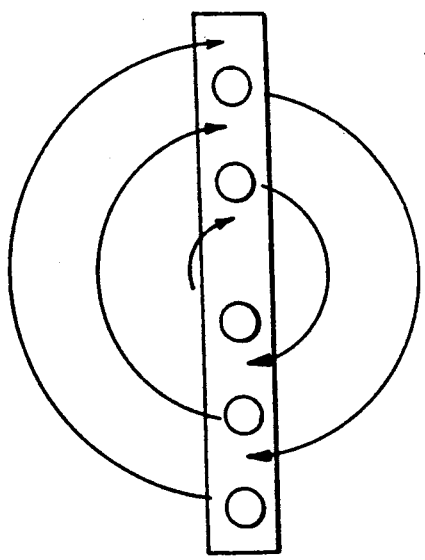
FIG. 20
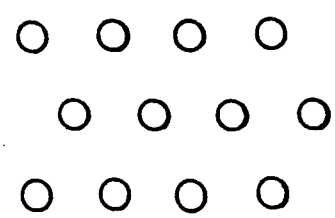

FLYING SPOT ENDOSCOPE

This is a divisional of co-pending application Ser. No. 07/436,446 filed on 14 Nov. 1989 still pending.

BACKGROUND AND BRIEF SUMMARY OF THE INVENTION

The present invention relates to endoscopic devices and in particular to a fiber optic endoscope embodying a "flying spot" fiber(s).

The transmission of light through thin fibers of glass or plastics have permitted a variety of instruments for the visualization of otherwise inaccessible organs and tissues inside the human body. Such instruments are broadly referred to as endoscopes and have been useful in the diagnosis and treatment of, for example, gastro intestinal and respiratory diseases.

In recent years, thin, flexible optical fibers have allowed for the remote viewing, photography, biopsy and surgery of organs and tissues. Such thin, flexible optical fibers, also known as fiber optics, are incorporated in endoscopes to enable the transmission of light to illuminate the internal space being viewed and/or enabling the object so illuminated to be viewed. Generally, the viewing capability is accomplished by aligning multiple fibers so that the relative position of each fiber is the same at each end of the bundle. The methods and apparatus transmitting images thereon is well known.

In addition to light and image transmission, endoscopes frequently have auxiliary channels through which fluids can pass, either to or from the observation site or through which implements and tools can be remotely controlled. In addition to the above, fiber optics are used in guiding laser radiation for applications in surgery, fluorescent methods of diagnosis and high intensity illumination. The fiber optics and endoscopes have also been applied to the development of a variety of transducers for the measurement and monitoring of parameters, such as blood flow, temperature, pressure and the like.

Recent developments have involved the use of fiber optics in an endoscope known as a cardioscope to allow for the visualization of intracardial structures. This field, better known as angioscopy, may be defined as the technique for visualization of the inner surfaces of blood vessels by means of the cardioscope. Since its introduction, advances in the use of the cardioscope have enabled the fiber optics to be inserted into arteries and vessels to enable visualization. Flexible fiber optic scopes have also been recently used to beam laser energy and to observe orifices in the coronary arteries of patients.

Because of these advances in the application of endoscopes, there is a continuing need to develop fiber optics of very small diameter which are nevertheless capable of performing all of the above-described functions. Typical endoscopes presently include a bundle of fiber optics, each having a light transmitting core and an outer cladding. The light enters the end of the core and through internal reflections passes down the core to the other end. A multiplicity of such fiber optics may be gathered together in a bundle along which light passes to illuminate the object at the distal end of the endoscope. A second bundle, arranged in a coherent manner, may also be incorporated to provide a means of viewing the illuminated area at the distal end of the endoscope. Various other channels, as described above, may be provided for the transmission of fluids, the control of miniature tools or surgical instruments or any other desired function. The illuminating bundle, the visualizing bundle and the auxiliary channels are gathered together in a multi-lumen or hollow cylindrical sheath. The sheath necessarily has: a thickness which increases the thickness and bulkiness of the endoscope, often preventing its use in smaller vessels of the body. The resolution of a fiber optic endoscope is limited by the core-to-core spacing. Below a certain spacing, cross talk degrades the image. Even above the theoretical fundamental limit there are practical problems in manufacturing a 'loose fiber' endoscope with a spacing of less than seven (7) microns. Therefore, it is desired to make an endoscope which has a decreased diameter to thereby increase the application of the endoscope in examining increasingly smaller blood vessels and for other uses as well. The present invention provides an endoscope of for example 0.5 to 2 microns effective fiber spacing.

It accomplishes this by using a multi-fiber whose adjacent cores are phase mismatched, a flying spot fiber(s) or a flying spot multi-fiber.

My invention, in a preferred embodiment, is a fiber optic endoscope which comprises a flying spot optic imaging device having fiber optic means to illuminate an object to be viewed and to view the object illuminated. The fiber optic has a proximal end and a distal end. Means to display the object viewed is in communication with the proximal end. A lens is in optical communication with the distal end. Means are provided to impart to the fiber optic, a scanning rode, which may be in the form of a X, Y raster, a spiral scan, an oscillating scan and/or a rotary scan.

In the preferred embodiment of the invention, the fiber optic comprises a multi-fiber and the fibers scan by movement of the fibers themselves. The object lens is substantially spherical. The output signal may be converted to a standard TV signal and displayed.

BRIEF DESCRIPTION OF THE DRAWINGS

FIG. 1 is a schematic illustration of a basic embodiment of the invention;

FIGS. 2a and 2b represent a schematic of a scan pattern;

FIG. 3 is a schematic of a lens;

FIG. 4 is a schematic illustration of a lens fiber optic combination;

FIGS. 5, 6 and 7 are schematic illustrations of an imaging technique of the invention;

FIGS. 13, 14, 15, 16 and 17 are schematics of fiber optic configurations;

FIGS. 18 and 19 illustrate alternative scanning modes;

FIGS. 20, 21 and 22 are fiber optic patterns of fiber optic combinations used in a rotary scan;

DESCRIPTION OF THE PREFERRED EMBODIMENT(S)

Figure 6:
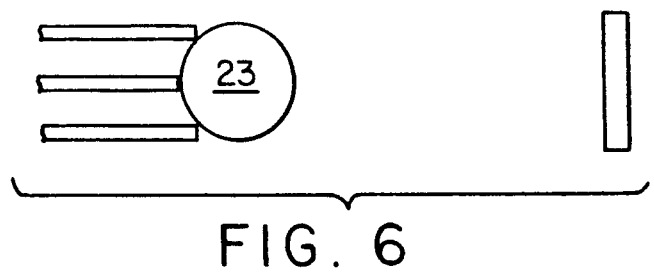

In the simplest embodiment of this invention, a single fiber traces out an X, Y raster. The fiber may be secured to an electromagnetic driver which provides a sinusoidal vibration at a high frequency $W_1$ in the X axis and a lower frequency $W_2$ in the Y axis gives a fair approximation of the traditional raster if the format is cropped and the return trace blanked out. Preferably, the format is cropped so the speed is not objectionably non-linear within the remaining format. Illumination can be carried out-bound in the same fiber that does the viewing. If the object is not viewed directly, but the viewing light as a function of time is detected and used to generate a video display then any background reflected light can be subtracted electronically from the image light. As shown in FIG. 1, general illumination of the field of view can be used with a light source that goes around the imaging optics. The object to be viewed is shown at 2. A fiber optic, 4, for illumination goes around the imaging optics, 6. The viewing fiber optic, 8, has its distal end in optical communication with the imaging optics, 6. In this embodiment, as with TV, the illumination may be a flying spot with unscanned viewing or the viewing may be a flying spot with unscanned illumination or they may both be scanned in synchronism. The fiber may be caused to vibrate with an electromagnetic driver 10. The fiber is preferably cut to a length such that it vibrates naturally at the X frequency, $W_1$, thus the excursion of the driving magnet need not be more than a small fraction of the tip excursion. Alternatively, a rectangular fiber to obtain a natural resonance vibration of $W_1$ on one axis and $W_2$ on the other axis can be used. Still further, the fiber can be very stiff or the driver can be near the loose end so that all the motion is provided by the excursion of the magnet itself. Resonance effects are used only to decrease the power and size of the magnet.

In another embodiment, as shown in FIGS. 2a and 2b, the scan can be a spiral. This can be accomplished by rotating the fiber rapidly about its axis. Referring to FIGS. 2a and 2b, a fiber 12 is secured to a shaft (not shown) of a motor 14 for rotation with the shaft. A bearing sleeve 16 is secured over the fiber. The rotational speed is held constant and the sleeve 16 is moved back and forth along the length of the fiber until the fiber is neutral. That is, the centrifugal and spring return forces are equal. The centrifugal force tends to make the fiber fly away from the center and the spring force tends to restore it. The centrifugal force is $W^2R$ and the restoring spring force is hR so the device is to a first approximation neutral. That is, it can fly around at any radius at just the right rotational frequency but will finally fly out of control in excess of that frequency. For any rotational frequency less than the critical frequency, the fiber will tend to stay centered. The fiber is caused to spiral outwardly and inwardly by either varying its rotational speed up and down about the neutral speed or by varying the bearing position to vary the neutral frequency or by changing the mass. This can be accomplished by pumping a liquid back and forth in a hollow tube in the fiber.

In either scanning format, X, Y or spiral, the object can be viewed directly as long as the proximal and distal ends scan out the same pattern and are synchronized. When a photodetector is used to generate a video signal, the electronic scanning pattern in the oscilloscope is caused to replicate the scan of the fiber and is synchronized with the fiber scanning pattern. Further, other scan format conversion systems can be used once there is an electronic signal and these other scan format conversion systems are well within the skill of the art.

Another important aspect of the invention is to use spherical lenses of high index material—preferably non-birefringent. With a very small sphere of index of refraction of 2.0, the image surface of an object at infinity lies on the surface of the sphere, as shown in FIG. 3. The image is shown in dots 20 on the sphere or lens 22. Typically, the diameter of the lens used in the device of my invention may be between 0.25 to 0.50 mm. Generally, spherical lenses are not used in these applications because the aberration is too great. However, the numerical aperture (na) is stopped at about 0.5, the aberration is less severe and the aberration scales down in proportion to the lens diameter. For a sphere of 0.020 inches in diameter, a resolved spot of about 1 micron has been measured for visual monochromatic light. This is close to the diffraction limit. As the sphere becomes larger, the aberration scales up linearly even though the diffraction spot size itself does not. A further reason prior art devices do not use spherical lenses is it is not easy to couple a spherical lens to a fiber. When the fiber is looking at an image 30° off-axis it should still be in contact and to minimize aberration should be looking at the center of the sphere. This is shown in FIG. 4.

Figure 7:
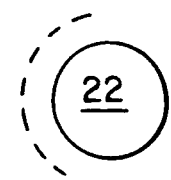

When the device of my invention is used to examine the walls of a cylinder, such as a blood vessel or ureter, if the fiber is 30° off axis (for example), it is not looking at an object far away but at the wall of a tube which is close by. This is shown in FIG. 5. Thus, to an approximation a "flat faced" scan approximates the image surface of a cylinder as seen through a spherical lens. To accomodate the view shown in FIG. 6, the scan of the fiber optic should follow the surface of the lens. For a sphere of index of refraction of 1.5 for example, instead of 2.0, the image surface 22 for an object at infinity is still a sphere but it is away from the surface of the lens. This is shown in FIG. 7.

The advantage of the spiral scan is that the fiber can be moving along its axis toward and away from the lens to keep the end of the fiber at or near the surface of the lens. With an X, Y raster scan, the motion required to follow the surface of a sphere would include a much higher frequency; that is, once per X scan instead of once per frame.

Figure 8:
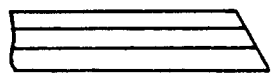
FIGS. 8 and 9 are illustrations of fiber optic ends.
Figure 9:
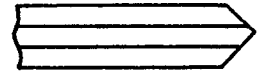

To partially correct for spherical aberration, the fiber tip can be cut on a bias, as shown in FIG. 8, to tip the exit cone toward the center of the sphere. This tipping is rotated in synchronism with the scan so that it remains inward. Of course, during that part of the scan when the fiber is near the center line, the tipping increases aberration. Preferably the tip of the fiber is bevelled, as shown in FIG. 9, so it will not hit the sphere.

Figure 10:
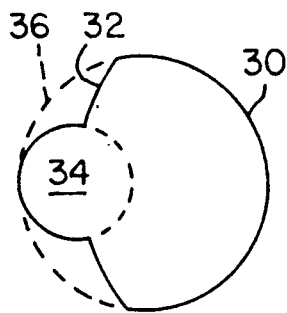
FIGS. 10 and 11 are illustrations of image planes with a lens of the invention.
Figure 11:
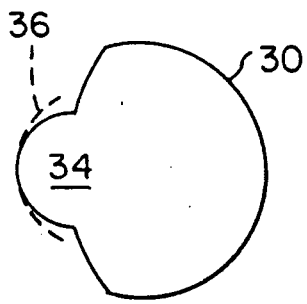

Surprisingly, it has been discovered that a lens of the geometry, such as shown in FIG. 10, gives a much improved image and allows the use of a non-biased fiber. A spherical lens 30 has a stepped surface 32 formed therein to create a sphere 34 within a lens 30. The diameter of the sphere 34 is between 0.5 to 0.6 of the diameter of the lens 30. This lens gives a much improved image contour 36. The image of a plane at infinity almost hugs the surface of the smaller sphere 34 out to about 30° and the aberration is greatly reduced because the principle ray of the fiber is tipped inwardly toward the center of the large lens. The exact image surface is shown in FIG. 11. The lens of FIGS. 10 and 11 requires no bias cut on the fiber and moves the image to slightly off the surface of the sphere. Thus, the use of the modified lens reduces spherical aberration.

To minimize or eliminate chromatic aberration, as will be described with reference to the preferred embodiment, a first frame is dedicated to red, a second frame to yellow or green and a third frame to blue. A spinning filter wheel at the proximal end accomplishes this. The spacing between the tip of the fiber and the sphere is slightly modified for each frame to put the surface traced out by the fiber as near as possible to the best focus of the color of that frame. Obviously, the ideal image surface varies with what one is viewing. Looking at a large cavity, such as a stomach, everything is at a large distance—approximately at infinity and the image tends to hug the sphere. Looking at a blood vessel (cylinder) the image surface is very much flattened.

Thus, the surface swept by the fiber can be tailored ad hoc by computer and feedback to approximate good focus for any reasonable object geometry. The techniques for determining the best focus are well known to those skilled in the camera art. Any corrections that are not symmetric about the axis will require a high frequency focusing mechanism.

Figure 12:
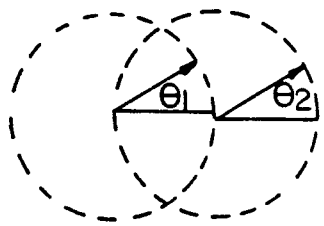
FIG. 12 illustrates a rotary scan.

In another embodiment of the invention, referring to FIG. 12, a spiral scan can be obtained with more certainty where the fiber is relatively stiff. The fiber is rotated and a double rotary motion is provided. $\theta_1$ is rapid and $\theta_2$ goes through one revolution per frame. When $\theta_2$ is inward, the fiber is at the center of the spiral. When $\theta_2$ is outward, the fiber is at the outer extremity of the spiral ($\theta_1$ is measured relative to the line connecting the two centers of rotation).

Figure 13:
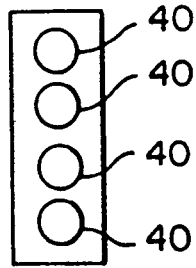
Figure 14:
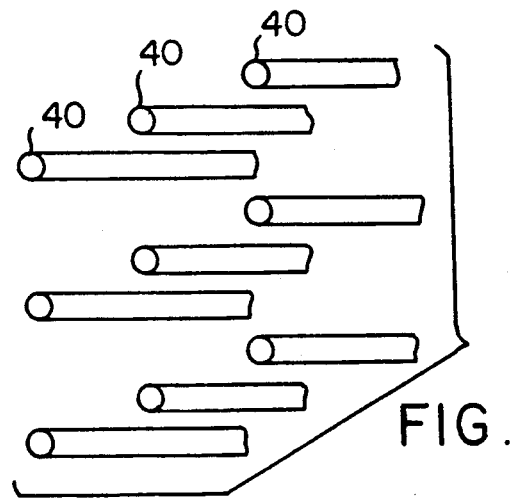

In a still further embodiment of the invention the single fiber flying spot is replaced by multiple fiber flying spots. Referring to FIG. 13 multiple cores 40 are shown. Each fiber scans one line in an X, Y raster instead of one fiber scanning in both X and Y. To avoid cross talk, the cores are spaced apart by 6 to 8 wavelengths (if the fibers have a n.a. of 0.5). To insure that the area is not sparsely scanned, each fiber scans rapidly in the X direction across the whole frame and scans slowly in the Y direction by at least the distance between the fibers. As shown in FIG. 14, this retains the minimal allowed fiber-to-fiber spacing but provides a dense scanning array in Y.

The spacing between cores can be decreased if the cores are not phased matched. Referring to FIG. 15, there are alternating cores 40 and 42. If 40 is made out of a glass of index 1.65 and 42 out of a glass index 1.60, and the cladding of index 1.52, the two cores are phased mismatched with a beat length of approximately 20 wavelengths (about 10 microns for visible light). This gives the requirement that the power transferred in 10 microns of length be small. It is well within the art to calculate the separation necessary to accomplish this (surface-to-surface spacing). It is approximately 1 to 2 microns (instead of 3 to 4 microns if the cores are phased matched).

In FIG. 16 an embodiment is shown wherein the spacing is further reduced. Here the alternating cores 40-42 have a separation of about 0.5 microns between adjacent cores with free space between the cores.

Referring to FIG. 17, in a three column array, cores 40 have an index of 1.65, cores 42 have an index of 1.60 and the cores 44 have an index of 1.63. The proximal and distal ends of the fibers are scanned in synchronism, or various electronic scanning means can be provided. For example, the proximal end can be held fixed against a single row charge coupling device (CCD) camera. The CCD is read out rapidly to accomplish a Y scan between adjacent pixels in the X direction. This is done repeatedly. The X scan is slow and the Y scan is fast.

FIG. 18 shows a means for generating a one dimensional oscillator motion without use of an electromagnetic driver. A fiber optic bundle 44 is secured to a relatively massive support 46. A rotary eccentric cam 48, driven by a shaft from the proximal end and suitably supported, engages the fiber optic 44 and oscillates the fiber optic as shown.

As shown in FIG. 19, in another embodiment, the cores of a fiber optic bundle are positioned so each of the cores in one half interlaces with the cores in the other half. The bundle is rotated about its central axis. As before, the scanning fiber can be used for illumination or viewing or both. The scan of FIGS. 18 and 19 may easily be accomplished by simply rotating the cam or fiber bundle, say for example, at 15 to 30 revolutions per second.

If illumination and viewing are not both scanned then efficiency in the use of the light is extremely low, in the ratio of the area of the fiber to the area of the frame. For 200 pixels across (40,000 pixels per frame) the efficiency is 1 over 40,000 if a single fiber is scanned. It is 200 over 40,000 or 1 over 200 if a strip of fibers as shown in FIG. 13 is scanned. The efficiency can be increased by scanning a sparse, two dimensional array of fibers, as shown in FIG. 20.

Increased separation adversely affects the efficiency of light used but not the resolution. By scanning both proximal and distal ends in synchronism, the discrete matrix appearance disappears. This is basically a multiple flying spot scanner. A number of scanning modes are possible such as previously described.

Figure 21:
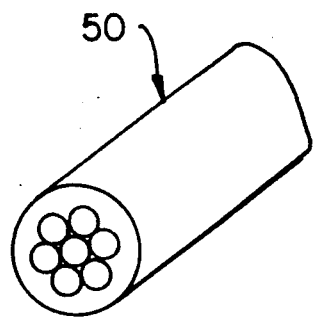
Figure 22:
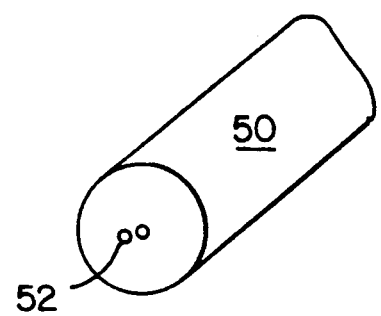

A preferred scanning mode, with a multi-fiber flying spot scanner 50 is simple rotation as shown in FIG. 21. Averaged over one complete rotation the coverage is reasonably uniform. This may be further improved upon by superimposing a rotation of the axis itself in which the axis 52 is displaced no more than the spacing between two fibers, as shown in FIG. 22.

The contouring of the distal end of this two dimensional bundle of fibers is similar to the surface generated by the single flying spot scanner previously described and the same lens 30 is useful. The fiber bundle can be tapered by a drawing process using a very short hot zone such as a laser beam as is known in the art. However, it has the disadvantage that any distortion that is not rotational symmetrical is deleterious to a rotary scanning mode and vibrational scanning is very limited if the surface is concave. A compromise to minimize damage from distortion is to use an oscillitory scan with small excursion with the same driving means shown in FIG. 18.

In a working fiberscope of the invention, two viewing devices can be used as previously described. For example, one device can look ahead and the other can look at right angles. One or both may be retractable so they will not interfere with the view of each other. In either case the lens can rotate with scanning rotation of the fiber or it can be rotated separately. In a further embodiment, two devices can be used to obtain a stereoscopic view. With this, one can illuminate through one scope and view through the other and then alternate rapidly, such as once per frame.

Figure 23:
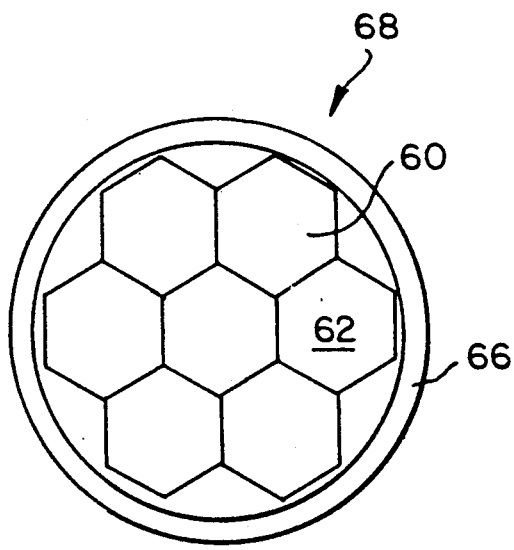
FIG. 23 is a schematic of a multi-fiber.
Figure 24:
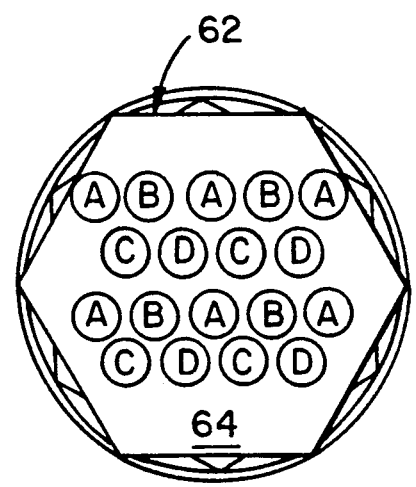
FIG. 24 is a schematic of a fiber bundle.

In the preferred embodiment of the invention, referring to FIGS. 23 and 24, a multi-fiber 60 comprises a plurality of fiber optic bundles 62, each drawn into a hexagonal shape, so they can be more easily nested when the multi-fiber is formed. Each bundle comprises cores A, B, C and D embedded in a cladding matrix 64. The cladding 64 is ordinary soda lime tubing having a refractive index of 1.52 such as available from Corning Glass or Owens Illinois. The Owens Illinois tubing is called $R_6$.

The four different cores each have indices of refraction as follows:
A. 1.56 (BaK 5)*
B. 1.58 (LF 5)*
C. 1.60 (F8)*
D. 1.62 (F2)*

This core material is available from Schott Glass Co., West Germany, *Schott catalogue numbers. The cores are arrayed, as shown in FIG. 24, such that no similar cores are adjacent one another. The cores and cladding are drawn together to form the bundle 62. The bundles are then drawn together in an outer glass sleeve to form the round multi-fiber 60. Although the bundles 62 are each shown as a hexagonal array, the arrays can be square, round etc. The resulting multi-fiber 60 has a number of distinct optical channels, each with its own cladding for optical isolation but fixed to its neighbor in the desired geometrical array. In the preferred embodiment, the cores are in a hexagonal pack. The minimum usable separation of the cores in the multi-fiber is determined by the refractive indices of the cladding and the cores and the core diameters.

The multi-fiber 60 is then finally encased in a smooth metal tube 66 to form a fiberscope 68. The number of cores in the multi-fiber 60 is about 10,000. Each core has a diameter of 0.8 micron. The core-to-core spacing measured center-to-center is 2.5 microns.

The lens 30 has the following dimensions and optical properties 0.5 mm diameter, index 2.0.

Figure 25:
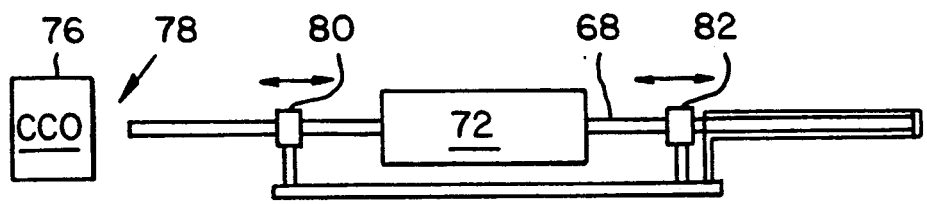
FIGS. 25 and 26 are schematic illustrations of a system embodying the invention.

Referring to FIG. 25, the fiberscope 68 is driven by a motor 72. The motor, such as a D.C. motor, has a hollow shaft. The fiberscope 68 is secured in the hollow shaft for rotation therewith. The proximal end of the fiberscope communicates with a CCD (charged coupled device) camera 76. Moveable ring bearings 80 and 82 are adapted to slide back and forth along the length of the fiberscope 68, with reference to its longitudinal axis to control the scan pattern. A light source 76 such as a xenon tube, provides the necessary illumination.

Figure 26:
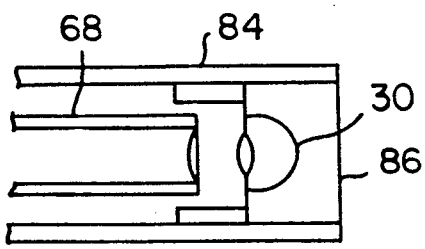

The fiberscope 68 and the lens 30 are received in a sheath 84 (the tip of the endoscope) which is inserted into the cavity under examination. (The fiberscope 68 may be used with any endoscope). The sheath 84 is secured to the housing supporting the motor 72 and bearings 80 and 82 in any suitable manner. Referring to FIG. 26, the lens 30 is secured to the sheath 84. Also, a window 86 is secured to the end of the sheath 84.

The fiberscope and lens 30 are rotated at 30 rps and the scanning mode is that shown in FIG. 21. The cores A, B, C and D transmit the light to the object. A typical phase mismatch beat length for the preferred embodiment would be 30 microns. The distal and proximal ends rotate in synchronism. The distal ends of the cores scan the image plane and the scanned image is returned via the cores A, B, C and D to the proximal end of the fiberscope where the image information is read by the CDD array. The transmission of the image and its display are well within the skill of the art whether the display be solid state imaging device, TV, oscilloscope, etc.

Figure 27:
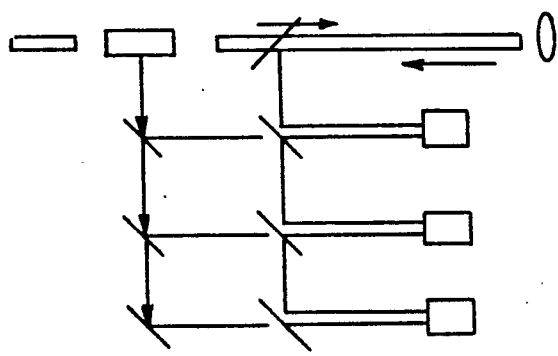
FIG. 27 is an illustration of a time gating system useful with the invention.

Although it is possible to send the illumination beam distally through the same path that the image travels, it is not always practicable to do this because of unwanted reflections. As a practical matter, in endoscopes, they are encased in sheaths, as shown schematically in FIG. 26, and typically include a window such as 86 distally beyond the lens 30 to keep foreign material away from the lens and, in this case, the vibrating fiber. The reflection from the window will vary as the fiber goes through its scan. One way to avoid the reflection problem is to illuminate with a pulsed laser and then gate the return signal so as to exclude reflections from the lens and the window. For example, for a given pulse the reflection from the lens will arrive first, then the reflection from the window and then the reflection from the object. As the object moves further away, the frame discrimination necessary to gate successfully becomes less difficult. A suitable gate mechanism is homodyning, i.e., a returning signal is beaten against a delayed pulse. The delayed pulse is made to overlap that part of the light train corresponding to the object. The return image light may be divided into three or four paths. This can be done optically or with the fiber optics. In any event, the reflective phase between the homodyne and signal pulse varies by 120° between detectors (or 90° if there are four detectors). An electronic logic circuit chooses the detectors which have the greatest signal difference. This difference is interpreted as the image signal. The homodyning only overlaps the object signal. Reflections from any other surfaces are not homodyned and so the detectors respond equally to these signals. This scheme is shown in FIG. 27.

The gating time for this homodyne scheme is limited by the pulse length available. It is possible within the art to achieve pulses as short as $10^{-11}$ seconds, or even $10^{-12}$ seconds. This corresponds to about 1 mm or 0.1 mm in object distance. Whereas, the most rapid photodiode response is about $10^{-9}$ seconds or a little shorter. This corresponds to about 10 cm in object distance.

The return light can also be gated with an electrooptic Mach-Zender or the like in $10^{-9}$ seconds to $10^{-10}$ seconds is about the practical limit for this application. The choice of a Mach-Zender, a homodyne device or a fast photo diode will depend primarily on the object distance expected to be encountered.

Therefore, with this embodiment, a signal channel (core) scanning fiber optic image device uses the same path, at least in part, for illumination and signal processing using time gating to discriminate between object signals and undesired backscatter or reflection in the system. Generally the device will have more than one channel and time gating will be provided for each channel. With the time gating, one may also derive a three dimensional image in the manner of radar by noting the time of arrival of the object signal.

An alternative to the time discrimination scheme is to carry the illumination down one channel and the return image back another channel so backscatter is not a problem.

Figure 28:
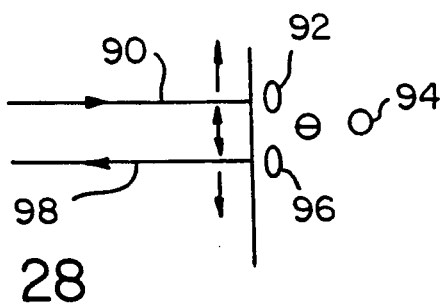
FIG. 28 is a schematic of an embodiment for illumination and viewing in synchronism.

In still another embodiment of the invention, referring to FIG. 28, both illumination and viewing are scanned in syncrhonism. Fiber 90 carries the illumination through lens 92 to the object 94. Lens 96 focuses the image, which image is carried by fiber 98. There is a convergence problem by the amount of the angle $\theta$. This angle decreases as the object distance increases. At the expense of illumination efficiency, the illuminating beam can be defocused to form a spot larger than the viewing spot. A disadvantage of having to control convergence is a potential advantage. By sweeping out the image with $\theta_1$ and then with $\theta_2$ then $\theta_3$, the distance dimension can be traced out. A second potential benefit is stereoscopic viewing on alternate scans the illumination can travel in A and the view in B and on the next scan the illumination in B and the view in A.

In the disclosure so far, reference has been to a two dimensional object. The fiberscope of the invention is also used for scanning a one dimensional object, such as a bar code on a scale, or two one-dimensional objects side-by-side, such as an object edge position along a scale.

Figure 29:
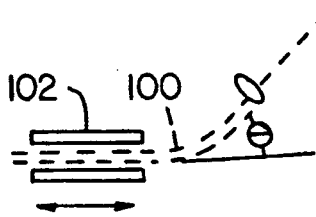
FIG. 29 is a schematic view of a fiber and lens fixed to one another for scanning as a single unit.

In the prior embodiments, there has been a fixed lens and a fiber(s) scanning relative to the lens. In this embodiment, the fiber and lens are secured to one another in a fixed relationship. The disadvantage is that scanning with the fiber-lens takes up more space. However, when the device is passing through a narrow aperture, such as a hypodermic needle, into a large cavity, such as the stomach, there is ample room for excursion of the scan. The advantage is that there is no problem of image degradation as the fiber moves off axis relative to the lens, because the two are fixed with the fiber on axis. As shown in FIG. 29, the fiber itself 100 (or members supporting the fiber) is permanently bent to some radius of curvature. The fiber 100 is supported by a long bearing 102. As the bearing is moved to the tip of the fiber, the fiber is forced to become straight. As the bearing is retracted away from the tip, the fiber bends to an angle $\theta$ depending upon the length of the free fiber beyond the bearing. The fiber-lens is rotated to accomplish the scanning motion which would be a spiral scan. Although described with reference to a single fiber, obviously multi-fibers can be used.

Having described my invention, what I now claim is:

1. A fiber optic scanning system comprising:
   a multifiber having a proximal end and a distal end, the multifiber having a first group of cores having an index of refraction $N_1$;
   a second group of cores having an index of refraction $N_2$, the cores being positioned in a matrix;
   the cores of the groups being arrayed so that the adjacent cores of any core are members of the other group;
   the indices $N_1$ and $N_2$ being greater than the index of the surrounding matrix and the index difference between $N_1$ and $N_2$ being great enough to produce substantial mismatch in the propagation constants in the cores and to substantially reduce cross talk between any core of one group and any core of the other group;
   means to scan the distal end of the cores in at least one dimension whereby said cores cyclically scan at least a line segment of an image formed in an image plane; and
   means to transmit an optical signal train to detect and to convert the optical signal into an electrical signal train and to modulate the electrical signal train into an electron beam which scans at the proximal end in a pattern analogous to the scan at the distal end.

2. A system of claim 1 wherein the index difference between $N_1$ and $N_2$ is at least about 0.02.

3. The system of claim 1 wherein the multifiber comprises at least a two dimension array and includes:
   third and fourth groups of cores having indices of refractions $N_3$ and $N_4$, the indices of refraction of $N_3$ and $N_4$ being different from one another and from either of the indices of refraction of the cores $N_1$ and $N_2$, the index of refraction between the higher and lower index cores being at least about 0.06.

4. The system of claim 1 which comprises:
   distal optics to form an image of an object onto the distal end of said fiber.

5. The system of claim 4 wherein the distal optics is a spherical lens.

6. The system of claim 5 wherein the distal lens includes a circular shoulder and a smaller hemispheric lens extends from the shoulder.

7. The system of claim 1 which comprises:
   proximal optics to project the image at the proximal end of the fiber.

8. The system of claim 1 which comprises:
   means to illuminate the object to be viewed.

9. The system of claim 1 which includes:
   means to scan the multiple cores across the image formed in the image plane to provide sequential viewing of substantially the entire area of the image.

10. The system of claim 1 which comprises:
    means to reconstruct and to display the scanned image.

11. The system of claim 10 wherein the means to display is a cathode ray tube.

12. The system of claim 1 wherein the means for reconstruction comprises:
    means to scan the proximal and distal ends in synchronism.

13. The system of claim 1 which comprises:
    means for scanning rotatably about the longitudinal axis of the multifiber.

14. The system of claim 1 where the multifiber carries the light to illuminate the object whose image is formed in the image plane.

15. A fiber optic scanning system comprising:
    a multifiber having a proximal end and a distal end and having a plurality of cores arrayed in a linear dimension, the cores phase mismatched to reduce cross talk and further comprising;
    a first group of cores having an index of refraction $N_1$;
    a second group of cores having an index of refraction $N_2$, the cores being positioned in a matrix;
    the cores of the groups being arrayed so that the adjacent cores of any core are members of the other group;
    the indices $N_1$ and $N_2$ being greater than the index of the surrounding matrix and the index difference between $N_1$ and $N_2$ being great enough to produce substantial mismatch in the propagation constants in the cores and to substantially reduce cross talk between any core of one group and any core of the other group;
    means to scan the distal end of the cores in at least one dimension whereby said cores cyclically scan at least a line segment of an image formed in an image plane;
    means to scan along an orthogonal dimension; and means to display the scanned image at the proximal end.

16. The system of claim 15 wherein the index difference between $N_1$ and $N_2$ is at least about 0.02.

17. The system of claim 15 which comprises:
distal optics to form an image of an object onto the distal end of said fiber.

18. The system of claim 17 wherein the distal optics is a spherical lens.

19. The system of claim 18 wherein the lens includes a circular shoulder and a smaller hemispheric lens extends from the shoulder.

20. The system of claim 15 which comprises:
proximal optics to project the image at the proximal end of the fiber.

21. The system of claim 15 which comprises:
means to illuminate the object to be viewed.

22. The system of claim 15 which includes:
means to scan the multiple cores across an image formed in the image plane to provide sequential viewing of substantially the entire area of the image.

23. The system of claim 22 which comprises:
means to reconstruct and to display the scanned image.

24. The system of claim 23 wherein the means to display is a cathode ray tube.

25. The system of claim 23 wherein the means for reconstruction comprises:
means to scan the proximal and distal ends in synchronism.

26. The system of claim 25 which includes:
third and fourth groups of cores having indices of refractions $N_3$ and $N_4$, the indices of refraction of $N_3$ and $N_4$ being different from one another and from either of the indices of refraction of the cores $N_1$ and $N_2$, the index of refraction being the higher and lower index cores being at least 0.06.

27. The system of claim 25 which includes:
third and fourth groups of cores having indices of refractions $N_3$ and $N_4$, the indices of refraction of $N_3$ and $N_4$ being different from one another and from either of the indices of refraction of the cores $N_1$ and $N_2$, the index of refraction being the higher and lower index cores being at least 0.06.

28. A fiber optic scanning system comprising:
a multifiber having a proximal end and a distal end with a two dimensional array of phase mismatched cores, a first group of cores having an index of refraction $N_1$;
a second group of cores having an index of refraction $N_2$, the cores being positioned in a matrix;
the cores of the groups being arrayed so that the adjacent cores of any core are members of the other group;
the indices $N_1$ and $N_2$ being greater than the index of the surrounding matrix and the index difference between $N_1$ and $N_2$ being great enough to produce substantial mismatch in the propagation constants in the cores and to substantially reduce cross talk between any core of one group and any core of the other group;
means to scan the distal end in at least one dimension whereby said core cyclically scans at least a line segment of an image formed in an image plane; and
means to display the scanned image at the proximal end.

29. The system of claim 28 wherein the index difference between $N_1$ and $N_2$ is at least about 0.02.

30. The system of claim 28 which comprises:
distal optics to form an image of an object onto the distal end of said multifiber.

31. The system of claim 30 wherein the distal optics is a spherical lens.

32. The system of claim 31 wherein the lens includes a circular shoulder and a smaller hemispheric lens extends from the shoulder.

33. The system of claim 28 which comprises:
means to illuminate the object to be viewed.

34. The system of claim 28 which includes:
means to scan the multiple cores across an image formed in the image plane to provide sequential viewing of substantially the entire area of the image.

35. The system of claim 34 which comprises:
means to reconstruct and to display the scanned image.

36. The system of claim 35 wherein the means to display is a cathode ray tube and the cathode ray scans synchronously in the analogous pattern.

37. The system of claim 35 wherein the means for reconstruction comprises:
means to scan the proximal and distal ends in synchronism.

38. The system of claim 28 which comprises:
means for scanning rotatably about the longitudinal axis of the multifiber.

39. The system of claim 28 which comprises:
proximal optics to project the image at the proximal end of the multifiber.

40. A fiber optic scanning system which comprises:
a multifiber having a proximal end and a distal end having a plurality of cores arrayed in a linear dimension, the cores having different indices of refraction, a first group of cores having an index of refraction $N_1$;
a second group of cores having an index of refraction $N_2$, the cores being positioned in a matrix;
the cores of the groups being arrayed so that the adjacent cores of any core are members of the other group;
the indices $N_1$ and $N_2$ being greater than the index of the surrounding matrix and the index difference between $N_1$ and $N_2$ being great enough to produce substantial mismatch in the propagation constants in the cores and to substantially reduce cross talk between any core of one group and any core of the other group;
means to scan the distal end of the cores in at least one dimension whereby said cores cyclically scan at least a line segment of an image formed in an image plane;
means to scan along an orthogonal dimension; and
means to display the scanned image at the proximal end.

41. The system of claim 40 wherein the index difference between $N_1$ and $N_2$ is at least about 0.02.

42. The system of claim 40 which comprises:
distal optics to form an image of an object onto the distal end of said multifiber.

43. The system of claim 42 wherein the distal optics is a spherical lens.

44. The system of claim 43 wherein the lens includes a circular shoulder and a smaller hemispheric lends extends from the shoulder.

45. The system of claim 40 which comprises:
proximal optics to project the image at the proximal end of the multifiber.

46. The system of claim 40 which comprises:
means to illuminate the object to be viewed.

47. The system of claim 40 which includes:
means to scan the multiple cores across an image formed on the distal end to provide sequential viewing of substantially the entire area of the image.

48. The system of claim 40 which comprises:
means for reconstructing and displaying the scanned image.

49. The system of claim 48 wherein the means for reconstruction comprises:
means to scan the proximal and distal ends in synchronism.

50. The system of claim 49 wherein the means to display is a cathode ray tube and the cathode ray scans synchronously in the analogous pattern.

51. A fiber optic scanning system comprising:
a multifiber having a proximal end and a distal end with a two dimensional array of cores, the cores having different indices of refraction, a first group of cores having an index of refraction $N_1$;
a second group of cores having an index of refraction $N_2$, the cores being positioned in a matrix;
the cores of the groups being arrayed so that the adjacent cores of any core are members of the other group;
the indices $N_1$ and $N_2$ being greater than the index of the surrounding matrix and the index difference between $N_1$ and $N_2$ being great enough to produce substantial mismatch in the propagation constants in the cores and to substantially reduce cross talk between any core of one group and any core of the other group;
means to scan the distal end in one dimension to cyclically scans at least a line segment of an image formed in an image plane; and
means to display the image at the proximal end.

52. The system of claim 51 wherein the index difference between $N_1$ and $N_2$ is at least about 0.02.

53. The multifiber of claim 52 which comprises:
distal optics to form an image of an object onto the distal end of said multifiber.

54. The multifiber of claim 53 which comprises:
proximal optics to project the image at the proximal end of the multifiber.

55. The multifiber of claim 54 wherein the distal optics is a spherical lens.

56. The multifiber of claim 55 wherein the lens includes a circular shoulder and a smaller hemispheric lens extends from the shoulder.

57. The multifiber of claim 51 which comprises:
means to illuminate the object to be viewed.

58. The multifiber of claim 51 which includes:
means to scan the multiple cores across an image formed on the distal end to provide sequential viewing of substantially the entire area of the image.

59. The multifiber of claim 58 which comprises:
means for reconstructing and displaying the scanned image.

60. The system of claim 59 wherein the means to display is a cathode ray tube and the cathode ray scans synchronously in the analogous pattern.

61. The multifiber of claim 58 wherein the means for reconstruction comprises:
means to scan the proximal and distal ends in synchronism.

* * * * *